(12) United States Patent
Addy (10) Patent No.: US 6,229,997 B1
(45) Date of Patent: May 8, 2001

(54) INTERFERENCE DETECTING RECEIVER (75) Inventor: Kenneth L. Addy, Massapequa, NY (US)

(73) Assignee: Pittway, Corp., Chicago, IL (US)

( * ) Notice: Subject to any disclaimer, the term of this patent is extended or adjusted under 35 U.S.C. 154(b) by 0 days.

(21) Appl. No.: 09/038,207

(22) Filed: Mar. 10, 1998

Related U.S. Application Data (60) Provisional application No. 60/043,735, filed on Apr. 21, 1997.

(51) Int. Cl.[7] .................................................. H04B 17/00
(52) U.S. Cl. .......................... 455/226.1; 455/1; 455/63; 455/67.3
(58) Field of Search ............................. 455/226.1, 226.3, 455/226.4, 423, 1, 63, 67.3, 67.1, 67.7; 340/539

(56) References Cited

U.S. PATENT DOCUMENTS

| | | | |
|---|---|---|---|
| 4,737,771 | * | 4/1988 | Coash ................................. 340/539 |
| 4,916,741 | * | 4/1990 | Ishikawa ............................... 381/13 |
| 5,603,087 | * | 2/1997 | Shultz ................................ 455/423 |

* cited by examiner

Primary Examiner—Edward F. Urban
Assistant Examiner—Blane J. Jackson
(74) Attorney, Agent, or Firm—Greenberg Traurig, LLP; Anthony R. Barkume (57) ABSTRACT

A method and apparatus for detecting interference in radio frequency signals for use in wireless alarm systems which increases a charge voltage in response to a dc-coupled signal during a charging time when the dc-coupled signal contains interference, decreases a charge voltage in response to a dc-coupled signal during a discharging time when the dc-coupled signal contains substantially no interference, compares the charge voltage to a reference voltage, provides an interference status signal in an off state when the charge voltage is less than the reference voltage, and provides the interference status signal in an on state when the charge voltage is greater than or substantially equal to the reference voltage. Also provided is a method and apparatus for detecting interference in radio frequency signals which converts a dc-coupled signal into digitized information, compares a set of characteristics of the dc-coupled signal to a set of reference characteristic, provides an interference status signal in an off state when the step of comparing indicates presence of interference in the dc-coupled signal, and provides the interference status signal in an on state when the step of comparing indicates absence of interference in the dc-coupled signal. Also provided is a receiver capable of interference detection which performs the functions of the present invention.

12 Claims, 7 Drawing Sheets

INTERFERENCE DETECTING RECEIVER

CROSS-REFERENCE TO RELATED APPLICATIONS

This application claims priority of United States provisional application Ser. No. 60/043,735 filed on Apr. 21, 1997, which is hereby incorporated by reference herein.

BACKGROUND OF THE INVENTION

The present invention relates to radio frequency receivers such as those used in wireless alarm systems in communication with a plurality of alarm sensors, and in particular radio frequency receivers comprising an interference detection circuit capable of detecting continuous and non-continuous interference.

Wireless security systems operating in residential and commercial buildings are often relied upon for "Safety of Life" applications where an alarm condition may signify a health or security emergency. Many national regulatory agencies place stringent requirements on the operation of these types of systems. For instance, in the United States Underwriter's Laboratory issues specifications, in the United Kingdom British Standards apply and in most of Europe CENELEC harmonized "norms" provide standardized requirements.

These specifications all include a requirement for the protection of system integrity against interference and jamming in the band of operation. Typically, it is required that an interference or trouble condition be indicated when a Continuous Wave (CW) Interferer or continuous interference source operates at a given power level (e.g., eight decibels above the sensitivity of the receiver) for a specified duration of time (e.g., for thirty seconds during a one minute duration or more than ten seconds). Likewise, an interference or trouble condition must be indicated when a non-continuous interference source, such as a stream of toggling data (e.g., 101010101010 . . . ) at the characteristic data rate of the system, persists for a specified duration of time (e.g. more than ten seconds) at a given power level (e.g., eight decibels above the sensitivity of the receiver).

Many low-cost systems are optimized for operation using Manchester encoded data to amplitude modulate (AM) wireless transmissions. At a corresponding receiver, the demodulated input is ac-coupled to block dc levels using, for instance, a capacitor in series between the antenna output and the receiver input. This is a particularly efficient method for decoding Manchester encoded data streams. However, the problem with ac-coupling is that it blocks continuous interference (which appears as a dc level upon demodulation) as well and, ideally, the system should detect the presence of continuous interferers and act accordingly. Another problem with ac-coupling is that despite the careful choice of capacitive values to match the data rate of the wireless transmission system, the resulting decay time of the ac-coupling may still be too fast or too slow to pass a particular non-continuous interference data stream.

Therefore, it would be advantageous if a communication system was suitable for use with alarm systems while providing means for effectively detecting continuous as well as non-continuous interference. In addition, such a system should provide a low cost solution to the interference detection problem that is readily adaptable to various national requirements specifying different interference parameters and patterns.

SUMMARY OF THE INVENTION

In accordance with present invention, a method for detecting interference in radio frequency signals is provided which comprises the steps of converting a dc-coupled signal into digitized information, comparing a set of characteristics of the dc-coupled signal to a set of reference characteristics, providing an interference status signal in an off state when the step of comparing indicates presence of interference in the dc-coupled signal, and providing the interference status signal in an on state when the step of comparing indicates absence of interference in the dc-coupled signal. The set of reference characteristics may comprise frequency or voltage characteristics of the interference. The method for detecting interference in radio frequency signals may further comprise the steps of increasing a charge voltage in response to a dc-coupled signal during a charging time when the dc-coupled signal comprises interference, decreasing a charge voltage in response to a dc-coupled signal during a discharging time when the dc-coupled signal comprises substantially no interference, comparing the charge voltage to a reference voltage, providing an interference status signal in an off state when the charge voltage is less than the reference voltage, and providing the interference status signal in an on state when the charge voltage is greater than or substantially equal to the reference voltage. The duration of the charging and discharging times may be modified by modifying values of circuit components. Noise may be reduced in the dc-coupled signal prior to the step of comparing the charge voltage to the reference voltage.

In further accordance with the present invention, an apparatus for detecting interference in radio frequency signals is provided which comprises means for converting a dc-coupled signal into digitized information, means for comparing a set of characteristics of the dc-coupled signal to a set of reference characteristics, means for providing an interference status signal in an off state when the means for comparing indicates presence of interference in the dc-coupled signal, and means for providing the interference status signal in an on state when the step of comparing indicates absence of interference in the dc-coupled signal. The apparatus for detecting interference in radio frequency signals may further comprise means for increasing a charge voltage in response to a dc-coupled signal during a charging time when the dc-coupled signal comprises interference, means for decreasing a charge voltage in response to a dc-coupled signal during a discharging time when the dc-coupled signal comprises substantially no interference, means for comparing the charge voltage to a reference voltage, means for providing an interference status signal in an off state when the charge voltage is less than the reference voltage, and means for providing the interference status signal in an on state when the charge voltage is greater than or substantially equal to the reference voltage. The apparatus for detecting interference in radio frequency signals may further comprise means for buffering the dc-coupled signal prior to the step of comparing the charge voltage to the reference voltage.

In still further accordance with the present invention, a circuit for detecting interference in a radio frequency signal is provided which comprises a charge monitoring device and a comparator. The charge monitoring device provides a charge voltage and increases the charge voltage in response to a dc-coupled signal during a charging time when the dc-coupled signal comprises interference. The charge monitoring device decreases the charge voltage in response to the dc-coupled signal during a discharging time when the dc-coupled signal comprises substantially no interference. The comparator compares the charge voltage to a reference voltage and provides an interference status signal in an off state in response to the charge voltage being less than the reference voltage. The comparator provides the interference status signal in an on state in response to the charge voltage being greater than or substantially equal to the reference voltage. The charge monitoring device comprises a charging path and a discharging path. The charging path may comprise the serial connection of a first resistor, a diode, a second resistor, and a capacitor between a supply voltage and ground. The duration of the charging time which results in a predetermined charge voltage is varied by modifying values of the first resistor, the second resistor, and the capacitor. The discharging path may comprise the serial connection of a third resistor, a diode, a second resistor, and a capacitor between a supply ground and ground. The duration of the discharging time which results in a predetermined charge voltage is varied by modifying values of the third resistor, the diode, the second resistor, and the capacitor. The circuit for detecting interference in radio frequency signals may further comprise a buffer which buffers the dc-coupled signal prior to the comparator and the buffer may comprise a noise reduction circuit comprising a capacitor.

In further accordance with the present invention, a circuit for detecting interference in radio frequency signals is provided which comprises an analog-to-digital converter that converts a dc-coupled signal into digitized information, and a processing unit which compares the digitized information to a set of reference characteristics representative of interference. The processing unit provides an interference status signal in an off state when the comparison indicates presence of interference in the dc-coupled signal and provides the interference status signal in an on state when the comparison indicates absence of interference in the dc-coupled signal.

In still further accordance with the present invention, a receiver capable of interference detection is provided which comprises means for receiving a radio frequency signal and providing a dc-coupled signal, means for detecting interference in the dc-coupled signal and providing an interference status signal, means for providing an ac-coupled signal from the dc-coupled signal, and means for quantizing the ac-coupled signal into a digital signal representative of information content from the radio frequency signal. The means for detecting interference comprises means for providing a charge voltage and means for comparing the charge voltage to a reference voltage. The means for providing a charge voltage increases the charge voltage in response to the dc-coupled signal during a charging time when the dc-coupled signal comprises interference and decreases the charge voltage in response to the dc-coupled signal during a discharging time when the dc-coupled signal comprises substantially no interference. The means for comparing the charge voltage to a reference voltage provides the interference status signal in an off state in response to the charge voltage being less than the reference voltage, and provides the interference status signal in an on state in response to the charge voltage being greater than or substantially equal to the reference voltage. The means for detecting interference may further comprise means for buffering the dc-coupled signal prior to the means for comparing the charge voltage.

In accordance with the present invention, a receiver capable of interference detection is provided wherein the means for detecting interference in the dc-coupled signal comprises means for converting the dc-coupled signal into digitized information and means for processing and comparing the digitized information to a set of reference characteristics representative of interference. The means for processing provides an interference status signal in an off state when the comparison indicates presence of interference in the dc-coupled signal, and provides the interference status signal in an on state when the comparison indicates absence of interference in the dc-coupled signal. The receiver capable of interference detection may further comprise means for timing a duration of the interference as indicated by the interference status signal.

DETAILED DESCRIPTION OF THE PREFERRED EMBODIMENT

Figure 1:
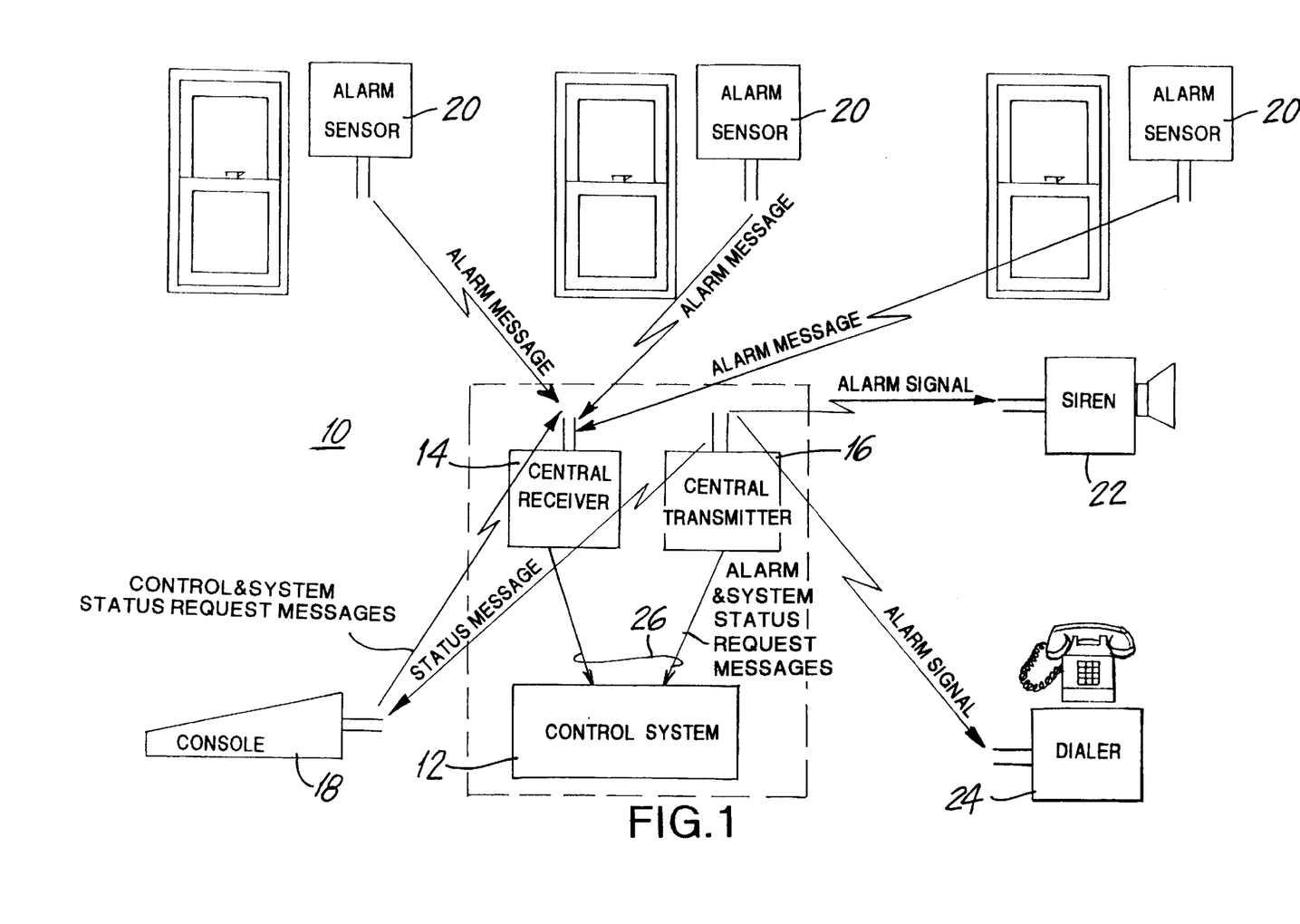
FIG. 1 is a block diagram of an alarm system comprising a preferred embodiment of the interference-detecting receiver or central receiver of the present invention.

FIG. 1 illustrates a block diagram of an alarm system 10 which comprises a control system 12, an interference-detecting receiver or central receiver 14 of the present invention, a central transmitter 16, a console 18, a set of alarm sensors 20, a siren 22, and a dialer 24. The control system 12 is connected via wires 26 to the central receiver 14 that receives alarm messages from the alarm sensors 20. The alarm sensors 20 are illustrated as sensing intrusions through a window but may comprise a variety of different types of sensors (e.g., glass break detectors, motion sensors. PIR sensors, contact switches, etc.). The alarm sensors 20 may be located at various positions throughout the installation area of a building or other structure. The central receiver 14 also receives control messages and requests for system status from the console 18 which comprises the primary user interface (e.g., a keypad) to the interference detecting alarm system 10 of the present invention. The central receiver 14 then forwards these messages to the control system 12 via wires 26, which then takes the appropriate action. For instance, if an alarm message is received by the control system 12, the control system 12 may issue an alarm message to the central transmitter 16 via wires 26 which is then broadcast by the central transmitter 16 to the siren 22, the dialer 24 and the console 18. If a status request message if received by the control system 12 then a status message will be issued to the central transmitter 16 which is then broadcast by the central transmitter 16 to the console 18 for display to the user in response to the user's request for status. Each of these devices (i.e., the siren 22, the dialer 24, and the console 18 which could be either wireless, as shown in FIG. 1, or wired) will then take the appropriate action such as dialing the police in the case of the dialer 24, or sounding an alarm in the case of the siren 22.

Due to the fact that alarm messages are typically transmitted on a single radio frequency channel and are often associated with "Safety of Life" applications which involve medical, safety, security or other emergencies, it is important that inadvertent jamming or interference does not prevent reception of the alarm message. Likewise, in high security burglary alarm system applications, intentional jamming must not be permitted to interfere with the transmission of alarm messages. Therefore, in order for an alarm system to be truly effective, it is imperative that such interference, whether it be continuous or non-continuous, be detected and dealt with accordingly (i.e., causing an interference alarm or emergency condition which is similar to the standard alarm condition).

Figure 2:
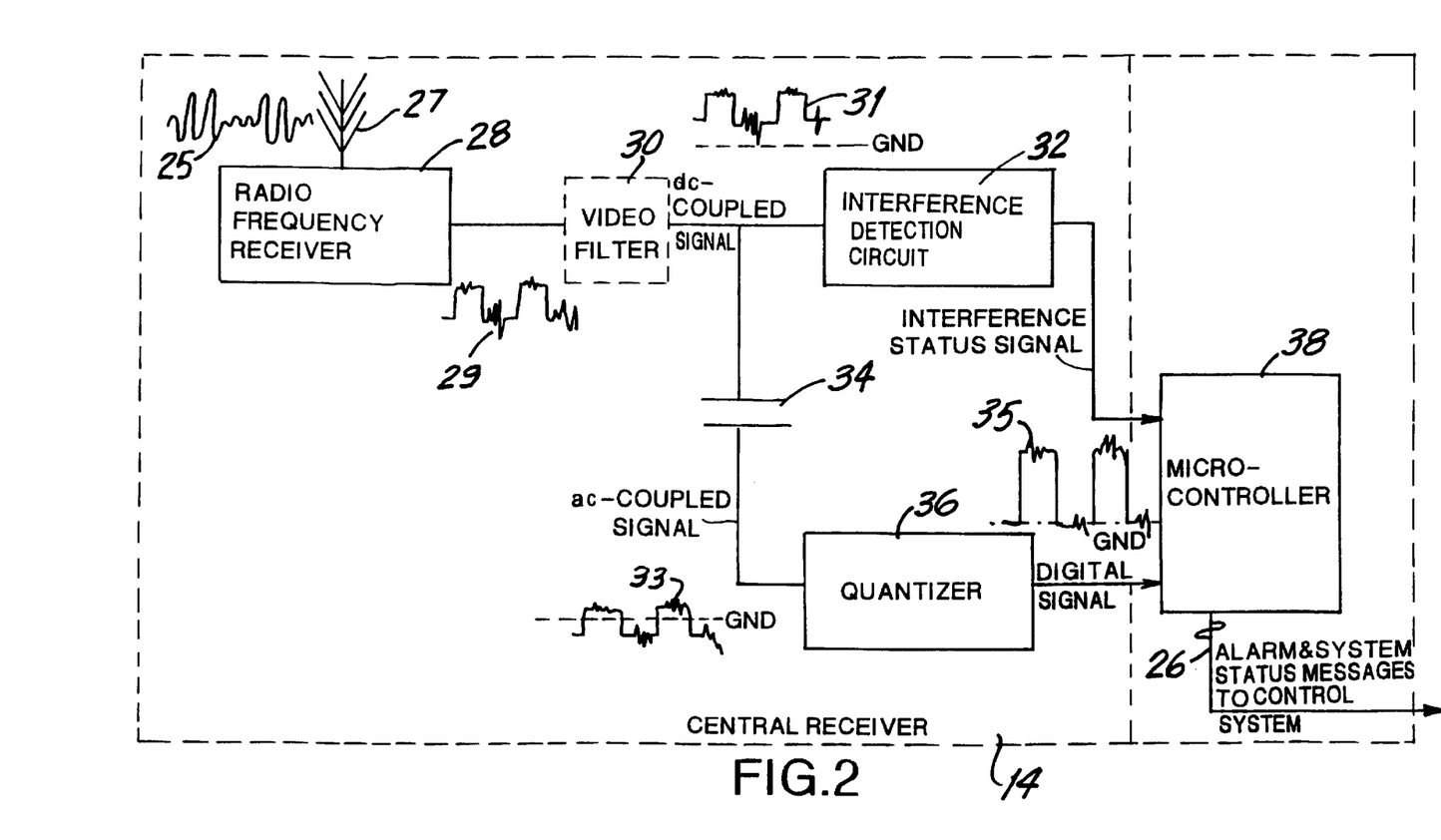
FIG. 2 is a block diagram of the central receiver of FIG. 1.

FIG. 2 shows a block diagram of the central receiver 14 which comprises a radio frequency receiver 28, an optional video filter 30, an interference detection circuit 32, an ac-coupling circuit 34, a quantizer 36 and an optional means for processing such as a microcontroller 38. The microcontroller 38 may either be included in the central receiver 14 or the control system 12. The radio frequency receiver 28 is a superheterodyne receiver well known in the art and described in R. Dorf, *The Electrical Engineering Handbook* (1993), which is hereby incorporated by reference. The radio frequency receiver 28 receives a radio frequency signal 25 from an antenna 27 and applies a detected signal 29 to the video filter 30. The radio frequency signal 25 is typically On-Off Keyed Amplitude Modulated. Greater detail regarding various modulation techniques can be found in M. Schwartz *Information Transmission, Modulation and Noise* (1980), which is hereby incorporated by reference. The radio frequency receiver 28 includes an intermediate frequency gain stage such as the NE614 manufactured by NEC electronics (not shown), which includes a received signal strength indicator (RSSI). The RSSI is used as a logarithmic detector to demodulate the radio frequency signal 25 and outputs a high level on the detected signal 29 during the period when the carrier is one and a low level on the detected signal 29 when the carrier is off. Since detection is performed logarithmically dynamic range problems commonly associated with detection and well known in the art are circumvented.

The video filter 30 is essentially a low pass filter which functions to reduce the amplification of noise (i.e., and, thus improving the signal to noise ratio (SNR)) introduced in conversion to an intermediate frequency (IF) in the radio frequency receiver 28. The video filter 30 provides a dc-coupled signal 31 to the interference detection circuit 32. The characteristics of the dc-coupled signal 31 applied to the interference detection circuit 32 are important in order to permit continuous interference, which would appear as a dc level following the video filter 30, to be detectable by the interference detection circuit 32. If the prior art method of ac-coupling the input to the interference detection circuit 32 were utilized, then continuous interference would not be detectable because the dc level indicating the presence of continuous interference would have been removed. Another problem with ac-coupling the input to the interference detection circuit 32 is that the pass band of the ac-coupling, when designed to match the data rate of the alarm system, may not coincide with the particular non-continuous interference rate and, therefore, the ac-coupling will block the detection of that particular non-continuous interference.

The interference detection circuit 32 will analyze the dc-coupled signal in order to determine the presence of continuous and non-continuous interference sources and output an interference status signal to the microcontroller 38. The interference status signal is a digital signal that indicates the presence and duration of continuous and non-continuous interference in the radio frequency signal received by the radio frequency receiver 28. An on state of the interference status signal indicates that continuous or non-continuous interference is present and exceeds the voltage threshold or reference voltage $V_R$ predetermined in the interference detection circuit 32. An off state of the interference status signal indicates the absence of continuous and non-continuous interference which exceeds a predetermined reference voltage $V_{REF}$. The reference voltage $V_{REF}$ is typically adjustable to coincide with applicable national regulations. The microcontroller 38 then records the duration of the on state and the off state and compares them with national standards delineating specifications for continuous and non-continuous interference sources in order to establish whether such interference is present in the radio frequency signal 25 according to such national standards and determines the appropriate action to take such as reporting an error condition to the control system 12.

Figure 3:
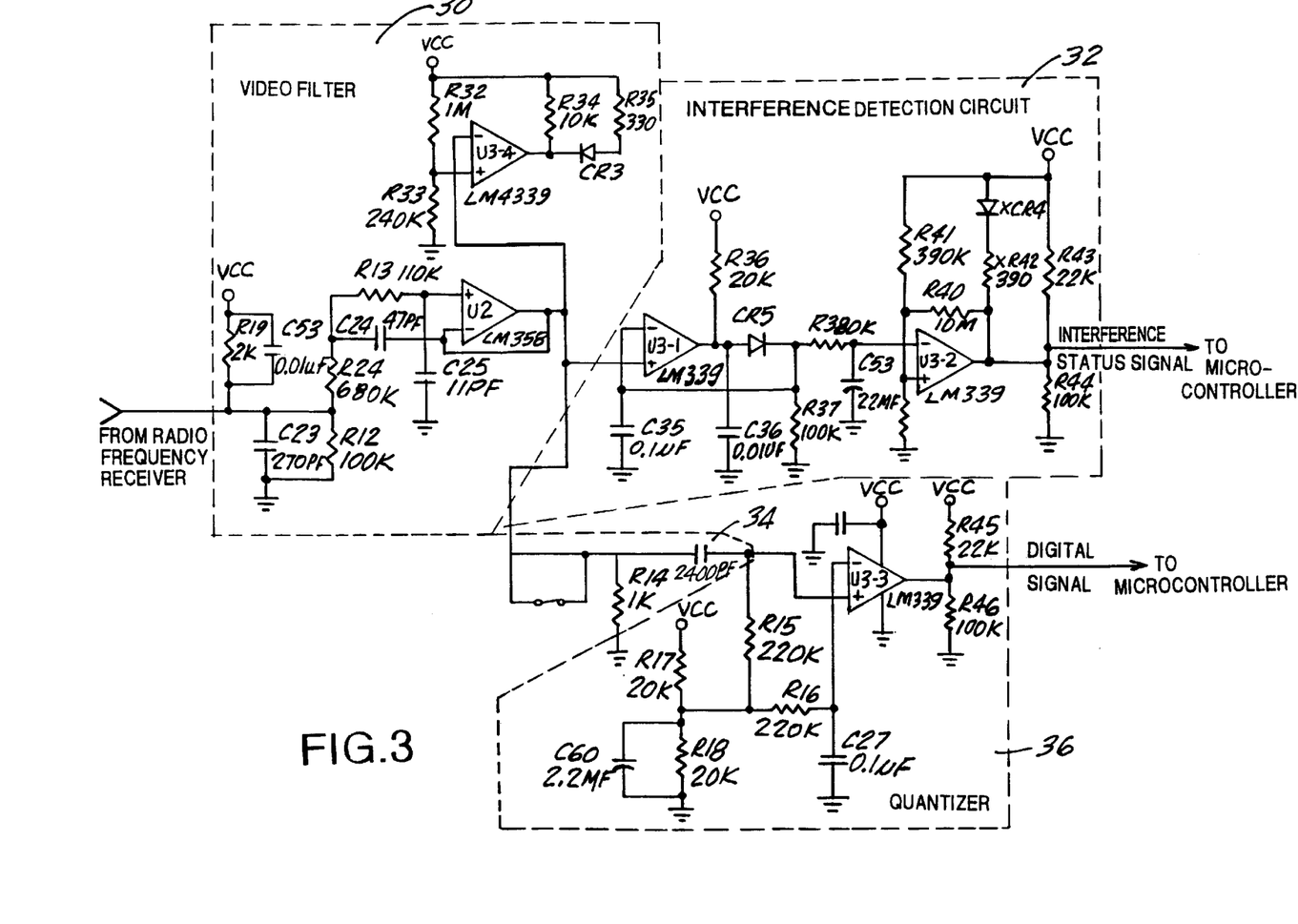
FIG. 3 is a schematic of an embodiment of a video filter, interference detection circuit and quantizer of the central receiver of FIG. 2.

The dc-coupled signal 31 output from the video filter 30 is also ac-coupled by the ac-coupling circuit, which may comprise a capacitor 34 as illustrated in FIGS. 2 and 3, prior to application to the quantizer 36 as an ac-coupled signal 33. As shown in FIG. 3, resistor R14 functions as a pulldown termination by means well known in the art. The quantizer 36 comprises a one-bit analog-to-digital converter or zero crossing detector which samples the ac-coupled signal 33 output from the capacitor 34 at a rate which exceeds the Nyquist Rate (i.e., twice the rate of the highest frequency signal component which carries information or the minimum sampling rate which does not result in aliasing). The quantizer 36 outputs a digital signal 35 representative of the ac-coupled signal 33 output from the ac-coupling circuit 34 to the microcontroller 38. In other words, the quantizer is set at a threshold substantially equal to 50% of full range of variation of the analog ac-coupled signal output, and when the ac-coupled signal 33 crosses the threshold a pulse or digital representation is output from the quantizer 36. The ac-coupled signal 33 is typically of the order of a few millivolts peak-to-peak, however, the quantizer 36 increases the peak-to-peak amplitude to that required by the microcontroller (e.g. five volts peak-to-peak). The microcontroller 38 then processes the digital signal 35 in order to derive the information content associated with a message (e.g., alarm and system status messages) within the radio frequency signal 25 and passes the information content, via the wires 26, to the control system so that it may act accordingly.

FIG. 3 illustrates a schematic representation of one embodiment of the video filter 30, the quantizer 36, and the interference detection circuit 32 (also shown in FIG. 2) which is intended to provide an example of a discrete circuit realization of some of the functions of the central receiver 14. The video filter 30, which comprises operational amplifiers U2 and U3-4, resistors R32–R35, r12, R19, R13, R24, capacitors C23–C25 and C53 and diode CR3, functions to remove noise created by the radio frequency receiver 28 in up or down converting the received radio frequency signal to the intermediate frequency and improve the Signal to Noise Ratio (SNR) without substantially reducing the information content of the signal. The theory, operation and realization of the active filters comprising the video filter 30 is provided in detail in R. Dorf *The Electrical Engineering Handbook* pp. 674–694 (1993), A. Budak *Passive and Active Network Analysis and Synthesis* (1974), W. K. Chen *Passive and Active Filters, Theory and Implementations* (1986) and L. P. Huelseman and P. E. Allen *Introduction to the Theory and Design of Active Filters* (1980), which are hereby incorporated by reference.

The quantizer 36 can be thought of as a one-bit analog to digital converter, which fundamentally operates as a zero crossing detector. The comparator U3-3 detects whenever the ac-coupled signal applied to its inverting input crosses a threshold set at approximately 50% of the range between VCC and ground applied at its non-inverting input. The threshold is set by resistors R17 and R18. Resistors R15 and R16 set a mid-rail slicing point and impose a dc level on the inputs to the operational amplifier U3-3. Capacitors C27 and C60 provide filtering of noise spikes from the reference voltage $V_{REF}$. Capacitor C26 provides power supply bypass capacitance for operational amplifier U3-1, U3-2, U3-3 and U3-4 by means well known in the art. R45 and R46 function as a Thevenin termination, which reduces undershoot and overshoot of the digital signal 35 by means well known in the art. Such a circuit is very effective at deriving the information content from Manchester encoded data by means well known in the art. Greater detail regarding Manchester encoding can be found in W. Stallings *Data and Computer Communications* (1985), which is hereby incorporated by reference. Those skilled in the art will realize that many other techniques and embodiments well known in the art may be utilized to realize the functions of the central receiver 14 illustrated in FIG. 2. A description of the operation of the interference detection circuit 32 is provided in detail below.

Figure 4:
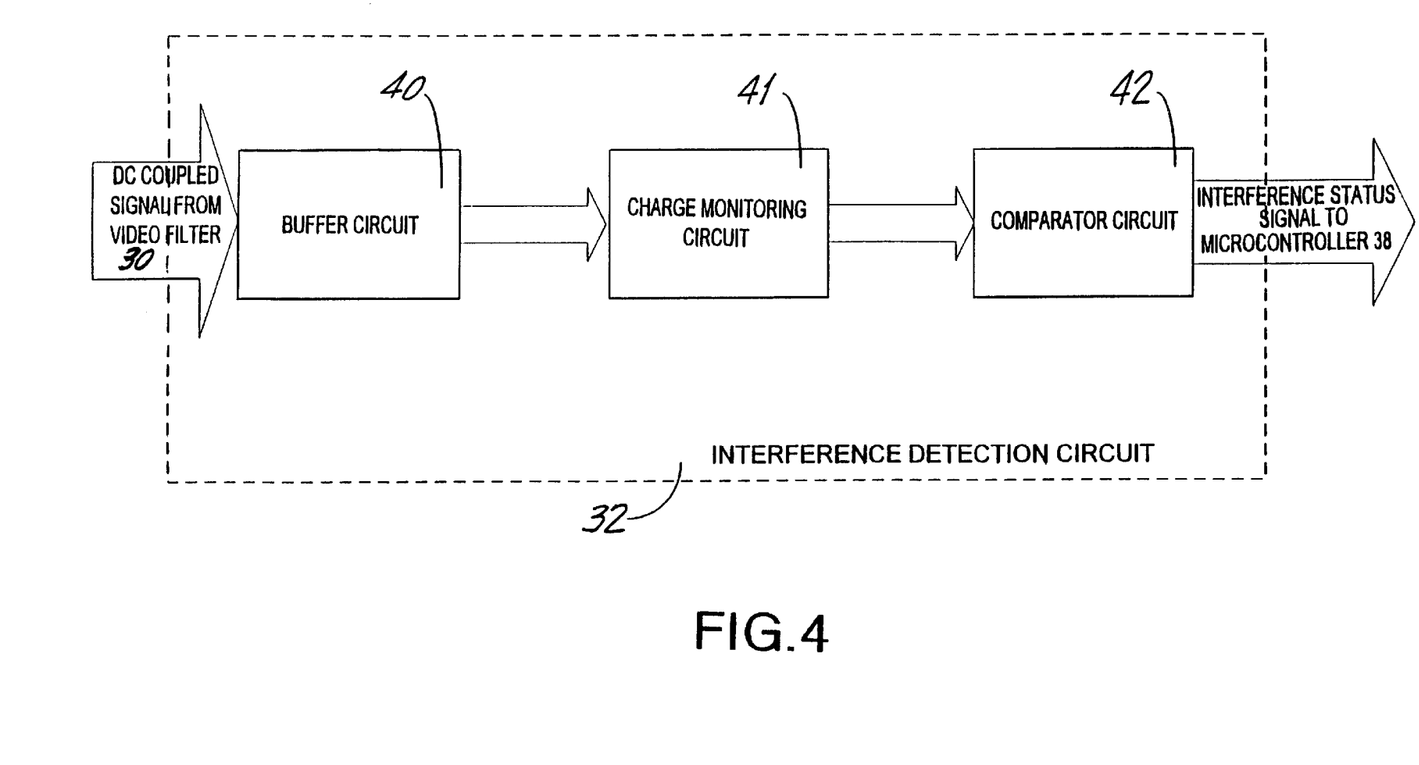
FIG. 4 is a block diagram of the embodiment of the interference detection circuit of FIG. 3.
Figure 5:
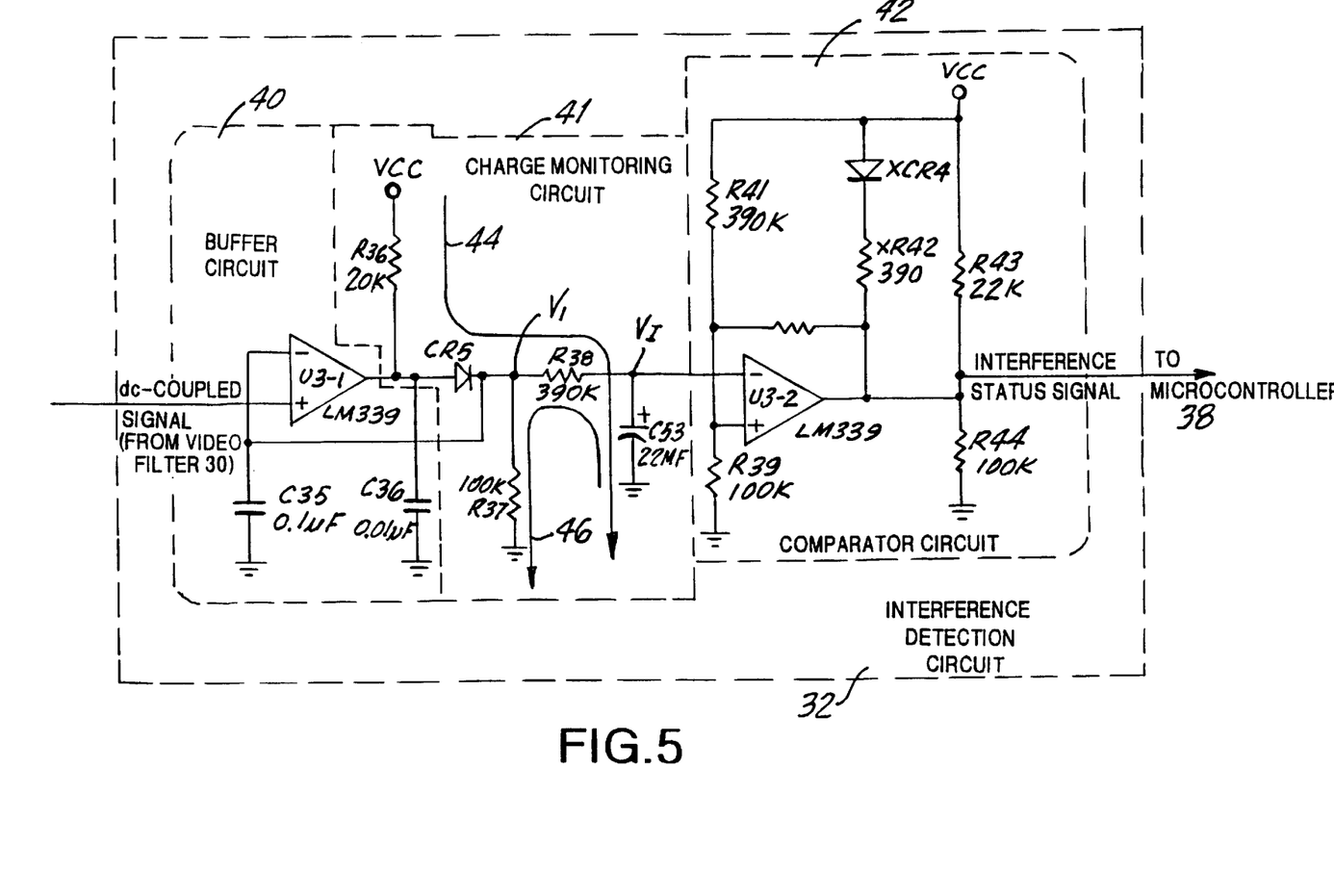
FIG. 5 is an exploded view of the schematic of the embodiment of the interference detection circuit of FIG. 3.

FIG. 4 illustrates a block diagram of one embodiment of the interference detection circuit 32, which comprises a buffer circuit 40, a charge monitoring device or circuit 41 and a comparator circuit 42. As shown in FIG. 5, the buffer circuit 40 comprises an operational amplifier U3-1 configured as a voltage follower that functions to buffer and impedance match the dc-coupled signal that is input to the interference detection circuit 32. The charge monitoring circuit 41 provides charging and discharging paths for a voltage $V_1$. The comparator circuit 42 compares a voltage $V_I$, which has been conditioned by the charge monitoring circuit 41, to a reference voltage $V_{REF}$ to determine whether interference is present.

The operative concept of the interference detection circuit 32 is based on the fact that the average amplitude exhibited by the dc-coupled signal 31, when it comprises interference, is greater than that when the dc-coupled signal 31 does not comprise interference and this results in greater charge build up. For the on-off keyed modulation utilized in the present invention, interference will cause the off-time and on-time of the signal to comprise higher average amplitudes which translates into greater buildup of charge to be compared with the reference voltage $V_{REF}$ as compared to a signal with less interference. In practice, the reference voltage $V_{REF}$ is set to detect interference that is sixteen decibels above the noise floor. Since decoding takes place at eight decibels above the signal-to-noise ratio (SNR), interference is defined to exist at eight decibels above the SNR at which the radio frequency signal is decoded. At such levels, any variations in the information content of the signal, such as a continuous stream of logical one's or high's, would be insufficient to register as interference which is detected at eight decibels above the SNR or approximately six times the power at which the signal is detected. Naturally the reference voltage $V_{REF}$ may be maintained at different levels according to local regulations, such as ten to twenty decibels above the SNR at which the signal is decoded.

As shown in FIG. 5 in greater detail, a voltage $V_1$ at the junction of diode CR5 and resistor R38 is substantially equivalent to the voltage of the dc-coupled signal at the input of the buffer circuit 40. The comparator circuit 42 comprises another operational amplifier U3-2 configured as a comparator which compares a voltage $V_I$ at the junction of resistor R38 and capacitor C53 against a reference voltage $V_{REF}$ set by and at the junction of resistor R39, resistor R40 and resistor R41. XCR4 and XR42 function as an indicator LED and its series resistor, respectively, which provide an indication of the presence of an interferer.

The reference voltage $V_{REF}$ is typically adjusted to a voltage which corresponds to an interference power level specified by the relevant national regulations in defining continuous and non-continuous interference, and can be adjusted during manufacture, installation or thereafter. Resistors R43 and R44 function as a Thevenin termination for the interference status signal by means well known in the art. If the voltage $V_I$ exceeds the reference voltage $V_{REF}$, then the interference status signal will be set to or remain at an on state (e.g., if the interference status signal is active low then the on state would correspond to a digital logic low voltage level or approximately 0 volts). Conversely, if the voltage $V_I$ does not exceed the reference voltage $V_{REF}$, then the interference status signal will be set to or remain at an off state (e.g., if the interference status signal is active low then the off state would correspond to a digital logic high voltage level or approximately 5 volts). The microcontroller 38 records the duration of the interference status signal in the on state via use of a digital counter, timer or equivalent means well known in the art. The on state indicates the presence of continuous interference or the duration of high time in non-continuous interference. The durational requirement for continuous interference sources vary from country to country but are typically in the order of seconds or tens-of-seconds. Despite the majority of interference regulations stated in terms of duration, the present invention is capable of designating the presence of interference without regard to its duration.

The capacitors C35 and C36 act as filter capacitors to remove noise spikes. The charge monitoring circuit 41 comprises a charging path or charging means 44 and a discharging path or discharging means 46. The charging path 44 comprises a series connection of resistor R36, diode CR5, resistor R38 and capacitor C53 across a supply voltage VCC and ground. The discharging path 4G comprises a series connection of capacitor C53, resistor R38 and resistor R37 across ground. If the duty cycle of non-continuous interference is large enough to charge C53 along the path 44 to a voltage which exceeds the reference voltage $V_{REF}$ then the interference status signal to the microcontroller 38 will be set to or remain in the on state. If the duty cycle of non-continuous interference source is not large enough to charge C53 along the charging path 44 to a charge voltage which exceeds the reference voltage $V_{REf}$ during a charging time then the amount of charge that has accumulated on capacitor C53 will discharge through the discharging path 46 during a discharging time or the off time of the non-continuous interference, and the interference status signal to the microcontroller 38 will be set to or remain in the off state. In the case of a continuous wave interference source, capacitor C53 will charge along the charging path 44 during the charging time to a voltage which exceeds the reference voltage $V_{REF}$ and remain charged for the duration of the interference source, and the interference status signal to the microcontroller 38 will be set to or remain in the on state.

The value of the reference voltage $V_{REF}$ may be altered by modifying the values of the circuit components comprising resistors R41 and R39. The reference voltage $V_{REF}$ is calculated by the following equation with respect to the supply voltage VCC:

$$V_{REF} = \frac{R39}{R39+R41}VCC \leftarrow (1)$$

By modifying the reference voltage $V_{REF}$ the power level in the received radio frequency signal (as translated to and exhibited by the voltage $V_I$) that is required to set the interference status signal to the on state is altered. For instance, if the reference voltage $V_{REF}$ is increased, then the power of the interference in the received radio frequency signal will need to be greater in order to set the interference status signal to the on state.

Likewise, the values and characteristics of the circuit components comprising resistor R36, diode CR5, resistor R38 and capacitor C53 may be modified by means well known in the art in order to change a charging time or time constant t of the charging path 44 and, therefore the time required to charge capacitor C53. When a dc voltage is applied to a purely resistive and capacitive circuit, the time constant t is that amount of time required to charge the capacitance to 63.2% of the applied voltage. The time constant t in seconds can be calculated from the following equation where R is the total resistance in ohms and C is the total capacitance in farads:

$$t=RC \leftarrow \qquad (2)$$

In a similar fashion, the values of resistor R37, resistor R38 and capacitor C53 may be modified by means well known in the art in order to change a discharge time or time constant t of the discharge path 46 and, therefore, that amount of time required to discharge capacitor C53. Thus, since the charge time, discharge time, and reference voltage $V_{REF}$ are independently variable, and the duration of on time and off time which constitutes the detection of a valid interference source is programmable via the microcontroller 38, the embodiment of the interference detection circuit 32 as illustrated in FIG. 5 is sufficiently versatile to meet the requirements for detecting continuous and non-continuous interference sources under a variety of national regulatory requirements using inexpensive components that may be changed and/or reprogrammed as desired.

Figure 6:
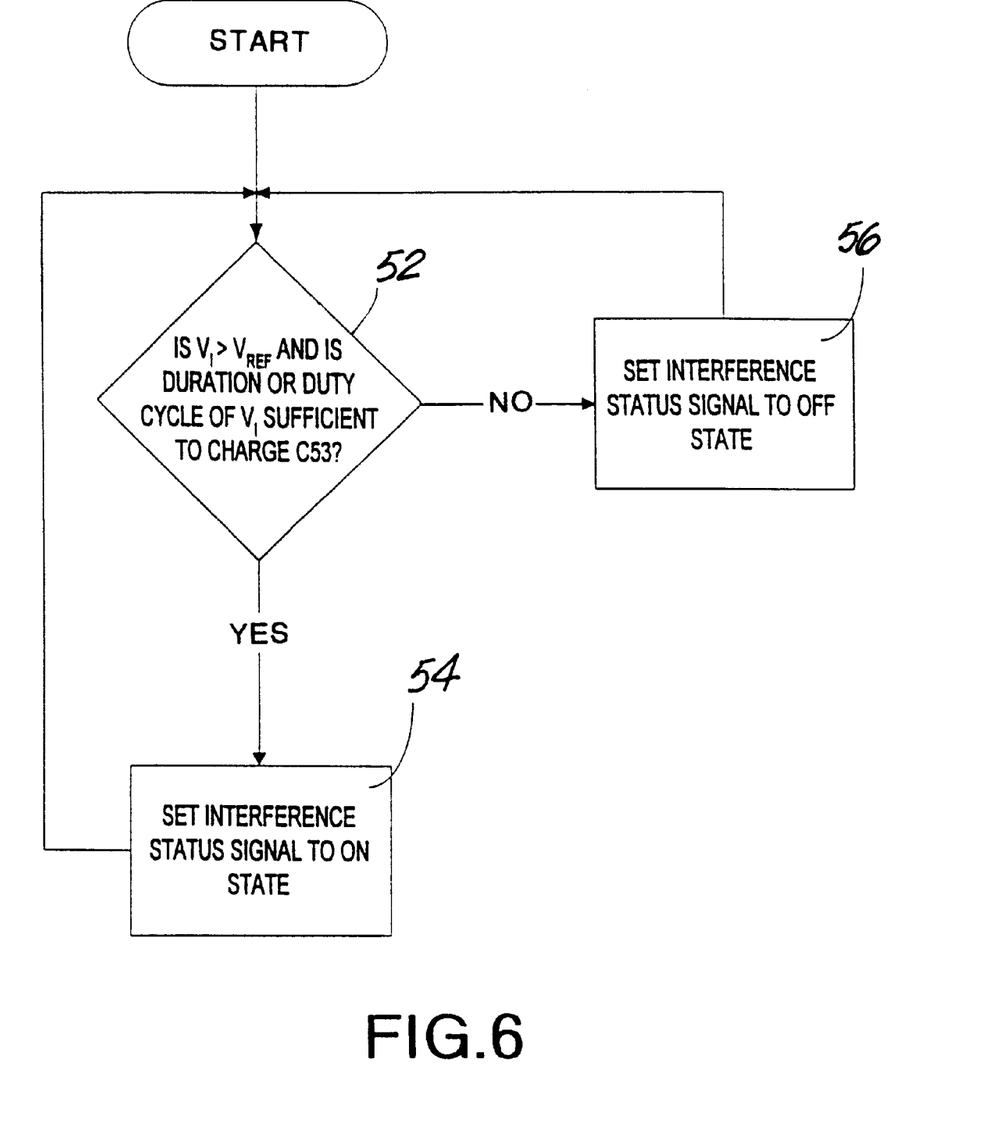
FIG. 6 is a flow chart illustrating the operation of the interference detection circuit of FIG. 5.

FIG. 6 illustrates a flow chart of the operation of the interference status signal that is carried out by the interference detection circuit 32 of FIG. 5. If the voltage $V_I$ is greater than the reference voltage $V_{REF}$ and the duty cycle or duration of $V_I$ is sufficient to charge C53 then the interference status signal will remain in or transition to the on state in step 54. The duty cycle of the voltage $V_I$ corresponds to the case where the interference is non-continuous in nature and the duration of the $V_I$ refers to the case where the interference is continuous in nature as determined by step 52. If either $V_I$ is not greater than $V_{REF}$ or the duration or duty cycle of $V_I$ is not sufficient to charge C53, then the status reference signal will remain at or transition to the off state in step 56.

In reference to FIG. 2, the presence of continuous or non-continuous interference source is determined by the microcontroller 38. The interference source is detected if the microcontroller 38 senses the presence of the interference status signal from the interference detection circuit 32 for a predetermined length of time which complies with the appropriate regulatory standards defining an interference source.

Figure 7:
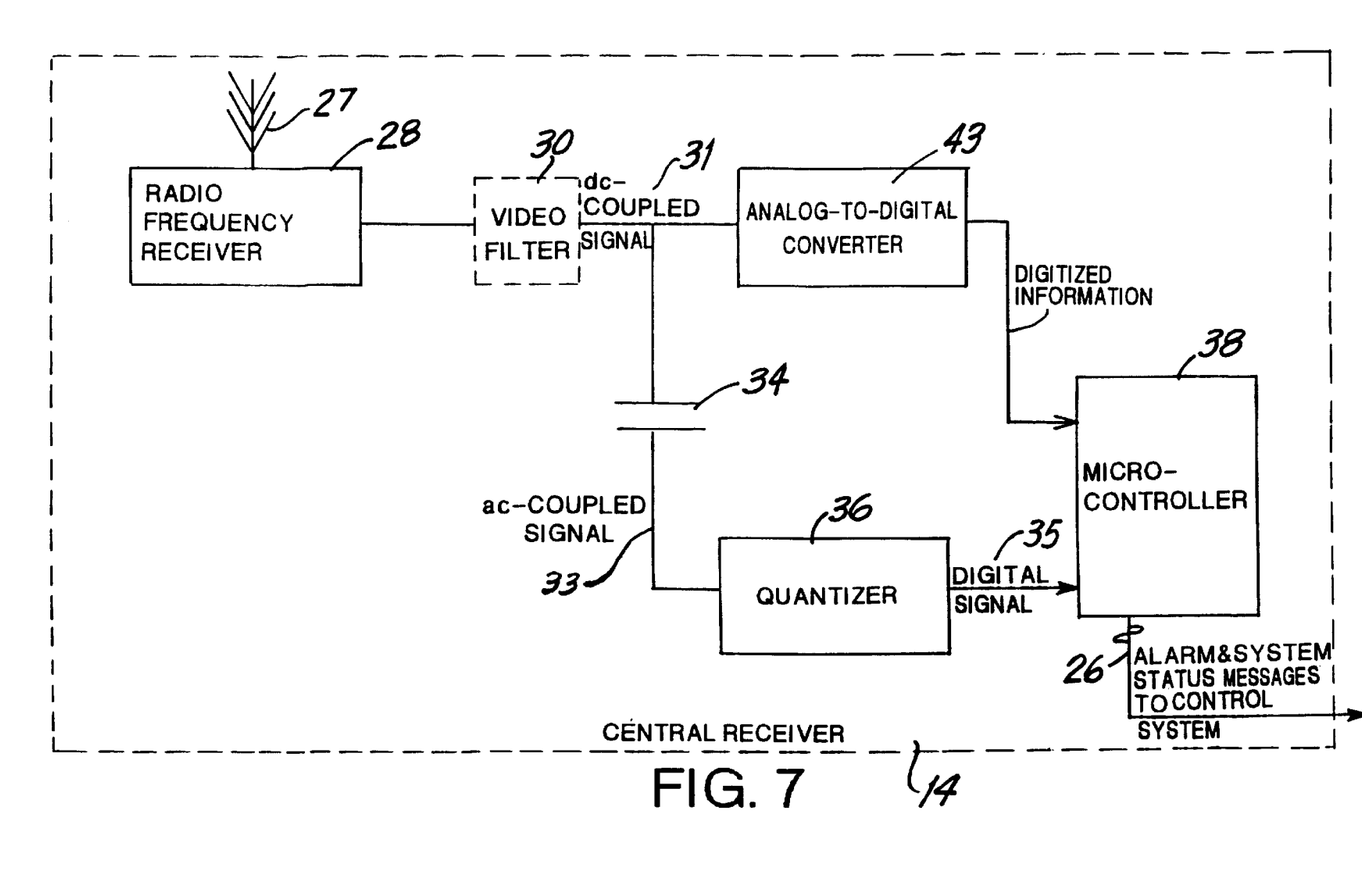
FIG. 7 is a block diagram of a second embodiment of the central receiver of the interference detecting alarm system of FIG. 1.

Although more costly at this time, it is possible to use an analog-to-digital converter 43 to sample the dc-coupled signal from the video filter 30 in order to indicate whether continuous or non-continuous interference is present as shown in FIG. 7. Since cost is generally a concern, the preferred implementation comprises low cost passive components and is be easily adjustable to enable interference and jamming detection responsive to various national requirements as set forth above in the description of the interference detection circuit 32 of FIG. 5. The analog-to-digital converter 43 digitizes the dc-coupled signal and provides digitized information representative of the magnitude of the time-sampled dc-coupled signal to the microcontroller 38. The microcontroller 38 could then process the digital information to detect the presence of interference as, for instance, extraneous modulation frequencies components or voltage levels occurring outside that ordinarily observed from the information contained in the signal received by the radio frequency receiver 28. The microcontroller 38 could then analyze the digital information to determine if interference is present by comparing its voltage or frequency characteristics to a set of reference characteristics indicative of interference by any of a number of means well known in the art of digital signal processing such as fast fourier transforms for frequency analysis or comparison to thresholds for analysis of voltage profiles. Once the microcontroller 38 has determined the presence of such interference, the microcontroller 38 could measure the duration of the interference by maintaining a digital counter, timer or alternative equivalent means well known in the art. If the detected interference persists for the required duration as specified by local regulations or similar standards, the interference is noted as having occurred by setting a bit in a status word or equivalent means well known in the art.

Although the invention has been shown and described with respect to best mode embodiments thereof, it should be understood by those skilled in the art that the foregoing and various other changes, omissions and additions in the form and detail thereof may be made therein without departing from the spirit and scope of the present invention.

What is claimed is:

1. A receiver capable of interference detection, which comprises:
    a) means for receiving a radio frequency signal and providing a dc-coupled signal;
    b) means for detecting interference in said dc-coupled signal comprising:
        i. means for providing a charge voltage and increasing said charge voltage in response to said dc-coupled signal during a charging time when said dc-coupled signal comprises interference, said means for providing decreasing said charge voltage in response to said dc-coupled signal during a discharging time when said dc-coupled signal comprises substantially no interference; and
        ii. means for comparing said charge voltage to a reference voltage and providing an interference status signal in an off state in response to said charge voltage being less than said reference voltage, said means for comparing providing said interference status signal in an on state in response to said charge voltage being greater than or substantially equal to said reference voltage;
    c) means for providing an ac-coupled signal from said dc-coupled signal; and
    d) means for quantizing said ac-coupled signal into a digital signal representative of information content from said radio frequency signal.

2. The receiver capable of interference detection of claim 1, wherein said means for detecting interference further comprises means for buffering said dc-coupled signal prior to said means for comparing said charge voltage.

3. The interference detection of claim 2, wherein means for buffering comprises means for reducing noise.

4. The receiver capable of interference detection of claim 1, further comprising means for filtering said dc-coupled signal and reducing noise in said dc-coupled signal following said means for means for receiving said radio frequency signal.

5. A wireless receiver configured to operate in an alarm system comprising:
   a) means for receiving an amplitude modulated signal and generating a data signal proportionate thereto,
   b) means for detecting interference in said data signal and for providing an interference status signal indicative of the presence of interference in said data signal,
   c) means for ac-coupling said data signal to render it suitable for processing, and
   d) first means for processing said ac-coupled data signal to determine the status of the alarm system,
   wherein said means for detecting interference in said data signal and for providing an interference status signal comprises:
      i) an analog-to-digital converter which converts the data signal to digital data samples,
      ii) processing means for processing and comparing the digital data samples to stored data to determine the presence of interference in said data signal, and
      iii) output means for providing the interference status signal that indicates the presence of interference in said data signal.

6. A wireless receiver configured to operate in an alarm system comprising:
   a) means for receiving an amplitude modulated signal and generating a data signal proportionate thereto,
   b) means for detecting interference in said data signal and for providing an interference status signal indicative of the presence of interference in said data signal,
   c) means for ac-coupling said data signal to render it suitable for processing, and
   d) first means for processing said ac-coupled data signal to determine the status of the alarm system,
   wherein said means for detecting interference in said data signal and for providing an interference status signal comprises:
      i) storing means for storing an initial voltage level of said data signal when said data signal is quiescent to produce a stored voltage level,
      ii) charging means for increasing the stored voltage level in response to an increase in the voltage level of said data signal,
      iii) discharging means for decreasing the stored voltage level in response to a decrease in the voltage level of said data signal,
      iv) comparison means for comparing the stored voltage level to an interference voltage level, and
      v) indication means for indicating the presence of interference when the stored voltage level is greater than the interference voltage level.

7. The wireless receiver of claim 6, wherein the interference voltage level corresponds to the amplitude modulated signal exceeding the sensitivity of the means for receiving by eight decibels.

8. A wireless receiver configured to operate in an alarm system comprising:
   a) means for receiving an amplitude modulated signal and generating a data signal proportionate thereto,
   b) means for detecting interference in said data signal and for providing an interference status signal indicative of the presence of interference in said data signal,
   c) means for ac-coupling said data signal to render it suitable for processing, and
   d) first means for processing said ac-coupled data signal to determine the status of the alarm system,
   wherein the amplitude modulated signal is Manchester encoded.

9. In a wireless alarm system wherein the status of wireless sensors is transmitted to a system controller using amplitude modulated signals, a method of detecting interference in said amplitude modulated signals comprising the steps of:
   a) receiving said amplitude modulated signal with a receiver,
   b) demodulating said received amplitude modulated signal to produce a dc-coupled signal,
   c) detecting interference in said dc-coupled signal,
   d) generating an interference status signal indicative of the presence of interference in said dc-coupled signal,
   e) ac-coupling said dc-coupled signal to produce an ac-coupled signal suitable for processing, and
   f) processing said ac-coupled signal to determine the status of the alarm system,
   wherein the step of detecting interference in said dc-coupled signal comprises the steps of: <i) storing an initial voltage level of said dc-coupled signal when said dc-coupled signal is quiescent to produce a stored voltage level,
      ii) increasing the stored voltage level in response to an increase in the voltage level of said dc-coupled signal,
      iii) decreasing the stored voltage level in response to a decrease in the voltage level of said dc-coupled signal,
      iv) comparing the stored voltage level to an interference voltage level, and
      v) indicating the presence of interference when the stored voltage level is greater than the interference voltage level.

10. The method of claim 9, wherein the interference voltage level corresponds to the amplitude modulated signal exceeding the sensitivity of the receiver by eight decibels.

11. In a wireless alarm system wherein the status of wireless sensors is transmitted to a system controller using amplitude modulated signals, a method of detecting interference in said amplitude modulated signals comprising the steps of:
   a) receiving said amplitude modulated signal with a receiver,
   b) demodulating said received amplitude modulated signal to produce a dc-coupled signal,
   c) detecting interference in said dc-coupled signal,
   d) generating an interference status signal indicative of the presence of interference in said dc-coupled signal,
   e) ac-coupling said dc-coupled signal to produce an ac-coupled signal suitable for processing, and
   f) processing said ac-coupled signal to determine the status of the alarm system,
   wherein the amplitude modulated signal is Manchester encoded.

12. In a wireless alarm system wherein the status of wireless sensors is transmitted to a system controller using amplitude modulated signals, a method of detecting interference in said amplitude modulated signals comprising the steps of:

a) receiving said amplitude modulated signal with a receiver, b) demodulating said received amplitude modulated signal to produce a dc-coupled signal, c) detecting interference in said dc-coupled signal, d) generating an interference status signal indicative of the presence of interference in said dc-coupled signal, e) ac-coupling said dc-coupled signal to produce an ac-coupled signal suitable for processing, and f) processing said ac-coupled signal to determine the status of the alarm system, wherein the step of detecting interference in said dc-coupled signal comprises the steps of:

a) digitally sampling said dc-coupled signal to generate digital dc-coupled data, b) processing said digital dc-coupled data to generate processed dc-coupled data, c) comparing said processed dc-coupled data to stored data, and d) indicating the presence of interference when said dc-coupled data is greater than said stored data.

* * * * *